(12) United States Patent
Woo

(10) Patent No.: US 6,637,758 B2
(45) Date of Patent: Oct. 28, 2003

(54) CAMBER CONTROL SUSPENSION

(75) Inventor: Seung-Hoon Woo, Kunpo (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/003,271

(22) Filed: Dec. 6, 2001

(65) Prior Publication Data

US 2002/0070509 A1 Jun. 13, 2002

(30) Foreign Application Priority Data

Dec. 7, 2000 (KR) .......................... 2000-74199

(51) Int. Cl.$^7$ ................................. B60G 3/26

(52) U.S. Cl. ................. 280/5.521; 280/86.751

(58) Field of Search ................ 280/5.52, 5.521, 280/5.522, 124.106, 124.107, 124.11, 124.16, 86.75, 86.751, 86.757

(56) References Cited

U.S. PATENT DOCUMENTS

| | | | | |
|---|---|---|---|---|
| 2,978,255 A | * | 4/1961 | Rosenkrands | 280/124.141 |
| 3,711,113 A | * | 1/1973 | Stammreich | 280/5.51 |
| 4,159,128 A | * | 6/1979 | Blaine | 280/5.521 |
| 4,373,743 A | * | 2/1983 | Parsons, Jr. | 280/124.138 |
| 5,873,586 A | * | 2/1999 | Krimmell | 280/124.113 |
| 6,267,387 B1 | * | 7/2001 | Weiss | 280/5.52 |

* cited by examiner

Primary Examiner—Eric Culbreth
Assistant Examiner—Faye M. Fleming
(74) Attorney, Agent, or Firm—Antonelli, Terry, Stout & Kraus, LLP

(57) ABSTRACT

The invention relates to a camber control suspension of a vehicle that can form a stable camber angle even at the time when the vehicle rolls as well as when bumping and rebounding, including a camber control rack and camber control links which function to control camber of wheels by stopping or moving according to the vertical motion of both wheels. As a result, a most stable ground contact state of the tires at all times is achieved to sufficiently enhance the groiund contact force of the tires at any running state of the vehicle.

3 Claims, 4 Drawing Sheets

CAMBER CONTROL SUSPENSION

CROSS-REFERENCE TO RELATED APPLICATIONS

This application is entitled to the benefit of Provisional Patent Application Ser. No. 60/222,671 filed Aug. 3, 2000.

BACKGROUND OF THE INVENTION

1. Field of the Invention

The present invention relates to a suspension of a vehicle, and more particularly to a suspension of a vehicle that can form a stable camber angle even at the time when the vehicle bumps and rebounds as well as when it rolls.

2. Brief Description of the Prior Art

In general, a camber is an angle that forms between a center line of wheels and a vertical line about road surface. The camber prevents the bottom part of front wheels from being stretched by weight and also the wheels from being loosened while a vehicle is running. Especially, camber also plays a role in facilitating an easy manipulation of a steering wheel along with an inclination angle of a kingpin.

However, camber is not always constant while the vehicle is running, but changes in angle according to the running state of the vehicle, mainly depending on types of selected suspensions. The different types of changes are described in accordance with a few types of suspensions.

First of all, FIG. 1 illustrates a conventional trailing arm type or a double wishbone type of a suspension that has the similar length of upper and lower arms. As shown in FIG. 1, it is possible to design a camber of wheels that can make the vertical motions with almost no change in the camber angle, close to 0 degree, even when the vehicle bumps and rebounds. However, there will be a great change in the camber angle as the vehicle rolls as shown in FIG. 2, thereby deteriorating contact capability of a tire tread which weakens cornering force.

Next, a conventional swing arm type or a double wishbone type of a suspension which has different length upper and lower arms, can be designed to keep changes in the camber of wheels 102 close to 0 when the vehicle rolls as shown in FIG. 4. Therefore, it is possible to sufficiently secure the ground contact capability of the tire tread onto the road surface. On the other hand, when the vehicle bumps and rebounds, there is a change in the camber which deteriorates straight running stability of the vehicle.

As described above, there is a problem in conventional suspensions in that conventional suspensions can optimally perform only either when bumping and rebounding or when rolling. The conventional suspension has had no alternative but bear the problem of deteriorating in performance for one of the aforementioned motions of the vehicle because the suspension has been designed for a vehicle operation of either when the vehicle runs straight or when the vehicle turns.

SUMMARY OF THE INVENTION

The present invention provides a camber control suspension of a vehicle that can provide optimum geometry during straight running or a turning state of the vehicle, thereby not only achieving stable contact of the tires when the vehicle is straight running with bumping/rebounding motions, but also forming sufficient ground contact of the tires for strong cornering forces when the vehicle is turning during rolling motion.

The present invention provides a camber control suspension comprising:
- two roll detecting links respectively connected to a front part of a wheel rotational center at a knuckle of a left wheel and to a rear part of the wheel rotational center at a knuckle of a right wheel and forming a L shape by being bent at a position where the links cross with a vertical line passing through the wheel rotational center;
- a rotary support bracket supporting a vehicle body and guiding rotations of the two roll detecting links;
- a differential gear unit having bevel gears installed at each end of the two roll detecting links for a pair of side gears;
- a worm gear formed at a differential gear case of the differential gear unit;
- a camber control rack formed with a gear meshed to the worm gear and horizontally installed with a vehicle axle to make a horizontal linear motion;
- camber control links connecting both sides of the camber control rack to both wheel knuckles; and
- lower links supporting a lower side of the wheel rotational center of the knuckles against a frame.

BRIEF DESCRIPTION OF THE DRAWINGS

Objects and aspects of the invention will become apparent from the following description of preferred embodiments with reference to the accompanying drawings in which.

DETAILED DESCRIPTION OF THE PREFERRED EMBODIMENT OF THE INVENTION

Hereinafter, a preferred embodiment of the present invention is described in detail with reference to accompanying drawings in which like parts are identified identically.

Figure 5:
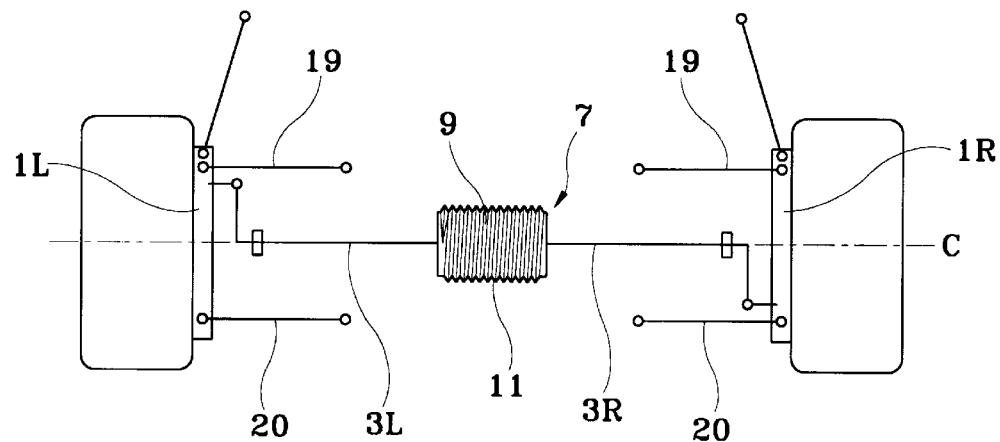
FIG. 5 is a plan view for illustrating the structure of a camber control suspension in accordance with the present invention.
Figure 6:
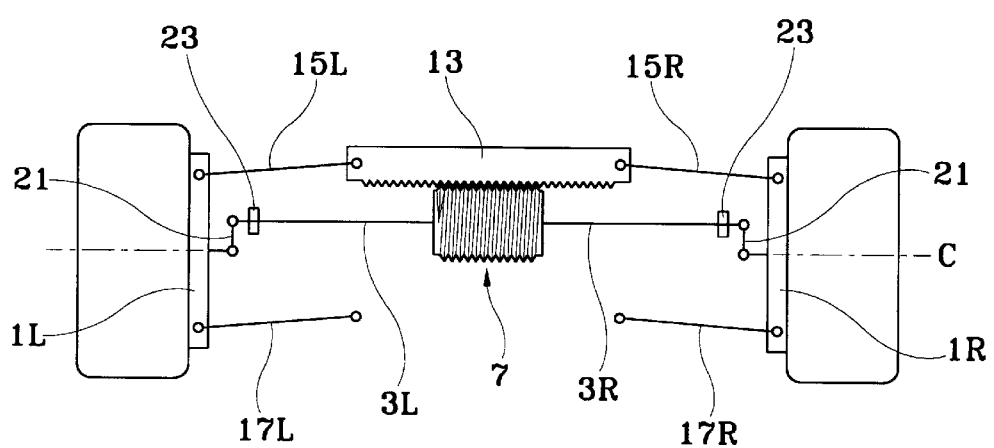
FIG. 6 is a front view of FIG. 5.

FIGS. 5 and 6 illustrate a camber control suspension in accordance with an embodiment of the present invention, comprising: two roll detecting links 3L, 3R respectively connected to the front part of a wheel rotational center at a knuckle 1L of a left wheel and to the rear part of the wheel rotational center at a knuckle 1R of the right wheel and forming a L shape by being bent at a position where the links cross with a vertical line passing through the wheel rotational center C; a differential gear unit 7 having bevel gears installed at each end of the two roll detecting links for both side gears 5L, 5R; a worm gear 11 formed at a differential gear case 9 of the differential gear unit 7; a camber control rack 13 formed with a gear meshed to the worm gear 11 and horizontally installed with a vehicle axle to make a horizontal linear motion; camber control links 15L, 15R connecting both sides of the camber control rack 13 to both wheel knuckles 1L, 1R; and lower links 17L, 17R supporting a lower side of the wheel rotational center C of the knuckles 1L, 1R against a frame.

For reference, the camber control rack 13 and camber control links 15L, 15R shown in FIG. 6 are omitted in FIG. 5. Lateral links 19 and tow links 20 may be installed as shown in FIG. 5.

The two roll detecting links 3L, 3R are connected to both knuckles 1L, 1R with ball joint links 21 having ball joints at both ends thereof. The ball joint links 21 are vertically installed to transmit the vertical motions of the wheels including the knuckles 1L, 1R to the roll detecting links 3L, 3R. The roll detecting links 3L, 3R are supported against the vehicle body through rotary supporting brackets 23 for rotation according to the vertical motion of the wheels transmitted through the knuckles 3L, 3R and ball joint links 21.

Figure 7:
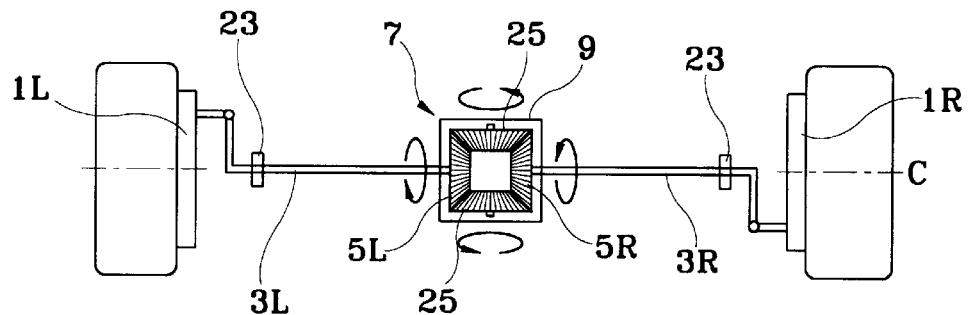
FIG. 7 is an explanatory view for illustrating the operational state of a differential gear unit at time of bumping/rebounding of a suspension in accordance with the present invention.
Figure 8:
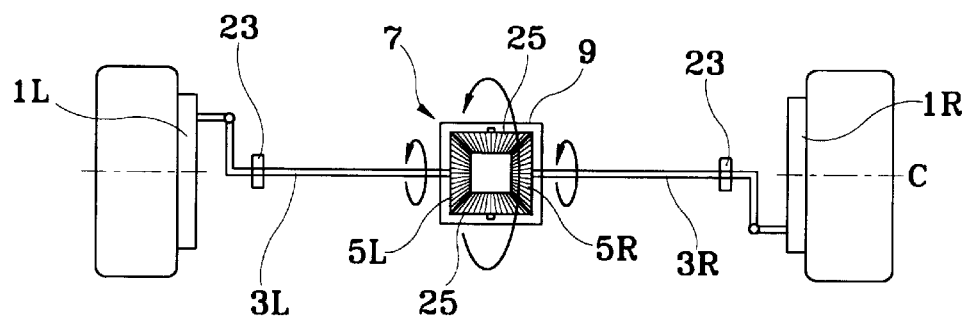
FIG. 8 is an explanatory view for illustrating an operational state of a differential gear unit at the time of rolling of a suspension in accordance with the present invention.

The differential gear unit 7 has a very similar structure to the conventional differential gear unit. As shown in FIGS. 7 and 8, the bevel gears installed at both ends of the roll detecting links 3L, 3R are regarded as side gears 5L, 5R. A pinion gears 25 are meshed with the two side gears 5L, 5R and a differential gear case 9 separated from the side gears 5L, 5R to support a rotational axle of the pinion gear 25 and rotatably installed at the external side of side gears 5L, 5R. There is only one difference from the conventional differential gear in that there is no ring gear assembled in the differential gear case 9 to receive rotational force from a propeller shaft.

The worm gear 11 is installed at the differential gear case 9, and the camber control rack 13 is meshed thereto, so that the camber control rack 13 can be linearly moved to the direction in parallel to the vehicle axle by rotation of the worm gear 11. At this time, the worm gear 11 is set for the camber control rack 13 to be linearly moved to the wheel to be rebounded. The camber control links 15L, 15R are connected to transmit the linear motion of the camber control rack 13 to the upper side of the wheel rotational center C of the both wheel knuckles 1L, 1R. The lower links 17L, 17R are constructed to support the lower side of the knuckles 1L, 1R against the frame of the vehicle body with the similar length of the camber control links 15L, 15R.

Operations of the present invention thus constructed are described below.

Figure 1:
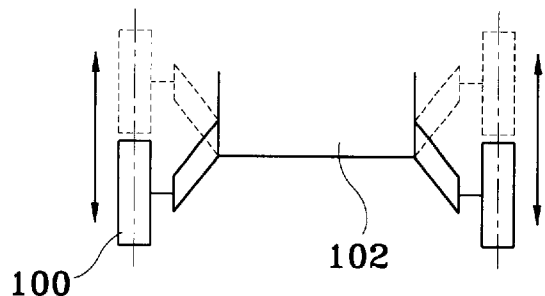
FIG. 1 illustrates bump/rebound motions of a general trailing arm type or a double wishbone type of a suspension that has similar length upper and lower arms.
Figure 1:
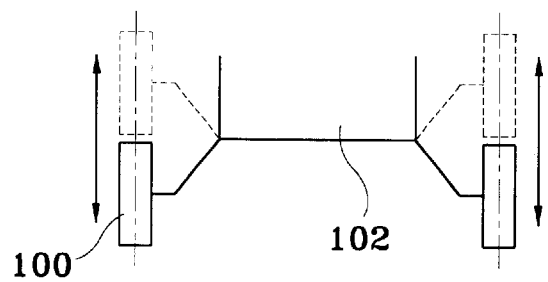
Figure 2:
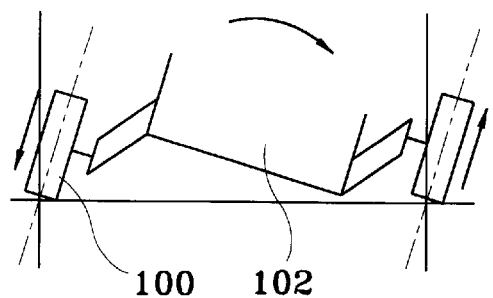
FIG. 2 illustrates a rolling motion of a general trailing arm type or a double wishbone type of a suspension that has similar length of upper and lower arms.
Figure 2:
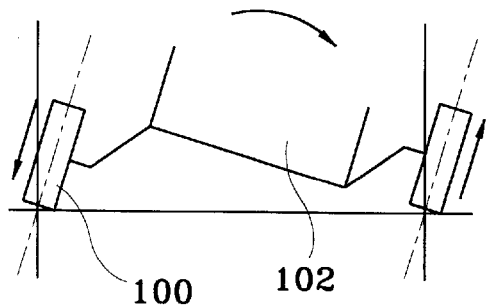
Figure 3:
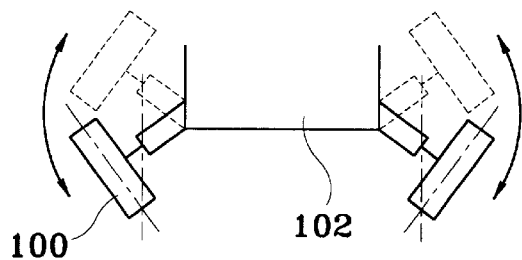
FIG. 3 illustrates a rolling motion of a general swing arm type or a double wishbone type of a suspension that has different length upper and lower arms.
Figure 3:
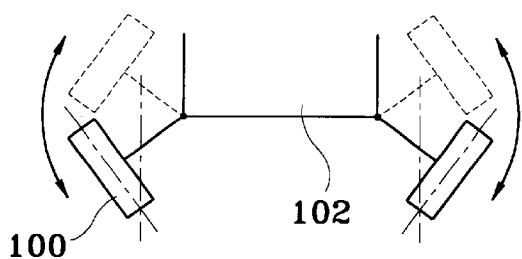
Figure 4:
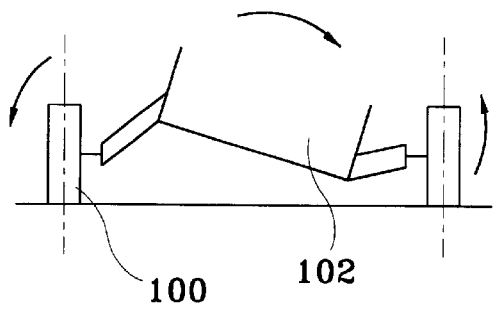
FIG. 4 illustrates a rolling motion of a general swing arm type or a double wishbone type of a suspension that has the similar length of upper and lower arms.
Figure 4:
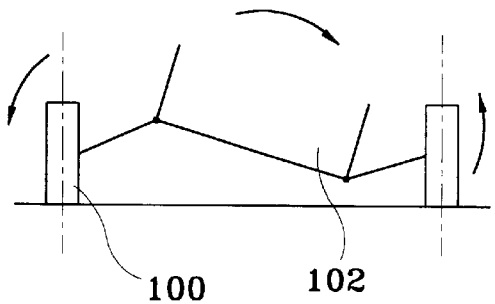

When both wheels vertically move simultaneously in straight driving or bump/rebound motions of a vehicle, the wheels move similarly to those in the double wishbone type suspension having similar length of arms as shown in FIG. 1 because the length of the camber control links 15L, 15R and that of the lower links 17L, 17R are similar. At this time, the vertical motion of the knuckles 1L, 1R rotates the roll detecting links 3L, 3R through the ball joint links 21, and the roll detecting links 3L, 3R are rotated in opposite directions as shown in FIG. 7. Thus, the side gears 5L, 5R connected to the roll detecting links 3L, 3R are rotated in the opposite directions to further rotate the pinions 25 of the differential gear unit 7. In other words, the pinions 25 are simply rotated, but the differential gear case 9 providing a rotational axle to the pinions 25 is not rotated.

Therefore, the camber control rack 13 meshed to the worm gear 11 installed in the differential gear case 9 maintains its fixed state without any movement. The camber control links 15L, 15R connected to the camber control rack 13 are operated with the lower links 17L, 17R with the special characteristics of the conventional trailing arm type or double wishbone type of a suspension having the similar length of arms. As a result, it is possible that a vehicle can secure a smooth straight running capability with sufficient ground contact force of the tires with almost no change in the camber when wheels are perform bump/rebound motions.

Next, the vertical motion of the wheels becomes opposite when a vehicle rolls or turns around. The knuckles 1L, 1R move in the opposite directions to carry both of the ball joint links 21 to opposite directions, which rotates the two roll detecting links 3L, 3R in an identical direction. At this time, two side gears 5L, 5R are under a unidirectional rotational force of the roll detecting links 3L, 3R. As the two side gears 5L, 5R do not rotate pinions 25, but revolve the pinions 25 in a fixed state about the circumference. As a result, the differential gear case 9 can be rotated.

Figure 9:
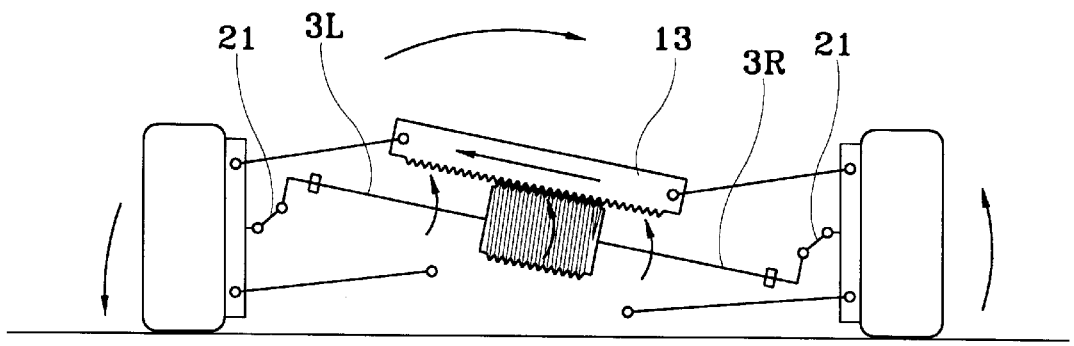
FIG. 9 illustrates an operational view of a suspension in accordance with the present invention at the time of rolling.

Next a description about the operations of the present invention is made with reference to FIG. 9 with rotations of the differential gear case 9 making it possible for the camber control rack 13 to perform a linear motion owing to worm gear 11. The linear motion is performed to a direction of a wheel, to which the camber control rack 13 is rebounding. In other words, in the drawing the linear motion of the camber control rack 13 is made to the left wheel. While the camber control link 15L pushes the upper part of the knuckle 1L of the left wheel to outside of vehicle body to thereby result in a change into a positive value of a camber, the upper part of the right knuckle 1R to be bumped is pulled by the camber control link 15R to thereby result in a change into a negative value of a camber. However, if the rolling motion of the vehicle body is considered, it is possible for a change in the camber against the road surface to be kept close to 0.

If the vehicle is turning to the reverse direction or rolling, the camber control rack 13 and two camber control links 15L, 15R are moved in the opposite directions and a change in the camber against road surface is kept close to 0, thereby making it possible to continuously secure good ground contact force.

As described above, not only when a vehicle runs straight or turns around, but also when a vehicle rolls or bumps/rebounds, the camber control rack and camber control links can adjust a camber of wheels by stopping or moving according to vertical motion of both wheels to thereby keep the best ground contact of tires against the road surface, thereby making it possible to secure good ground contact of the tires for safe drive at any running state of a vehicle.

In addition, the present invention has a similar structure to a double wishbone or multi-link type suspension, so that it is advantageous in securing other functions of the conventional double wishbone or multi-link type suspension in addition to the camber controlling function described above.

What is claimed is:

1. A camber control suspension comprising:

two roll detecting links respectively connected to a front part of a wheel rotational center at a knuckle of a left wheel and to a rear part of a wheel rotational center at a knuckle of a right wheel which form a L shape and are bent at a position where the links cross with a vertical line passing through the wheel rotational center of the wheels;

a rotary support bracket contacting a vehicle body and which guides rotations of two roll detecting links;

a differential gear unit including two side gears respectively installed at each end of the two roll detecting links;

a worm gear located on an exterior of a gear case of the differential gear unit;

a camber control rack formed with a gear meshing with the worm gear and horizontally installed with a vehicle axle to provide a horizontal linear motion;

camber control links connecting respective sides of the camber control rack to the wheel knuckles; and lower links supporting a lower side of the wheel rotational centers of the knuckles against a frame of the vehicle.

2. The suspension, as defined in claim 1, wherein the two roll detecting links are connected to the knuckles through ball joint links which comprise one end ball joint vertically connected to the roll detecting links and another end ball joint connected to the knuckles.

3. The suspension, as defined in claim 1, wherein the camber control rack is installed over a case of the differential gear and the camber control links are connected to transmit the linear motion of the camber control rack to an upper side of the wheel rotational center of both wheel knuckles.

* * * * *